United States Patent [19]

Nojima

[11] Patent Number: 5,184,936
[45] Date of Patent: Feb. 9, 1993

[54] MULTIPLE-GAS-PHASE TIDAL POWER GENERATION APPARATUS AND METHOD

[75] Inventor: Hisatake Nojima, Kagoshima, Japan

[73] Assignee: Yugen Kaisha Parasight, Chiba, Japan

[21] Appl. No.: 623,448

[22] PCT Filed: Sep. 19, 1989

[86] PCT No.: PCT/JP89/00946
 § 371 Date: Dec. 7, 1990
 § 102(e) Date: Dec. 7, 1990

[87] PCT Pub. No.: WO90/03516
 PCT Pub. Date: Apr. 5, 1990

[30] Foreign Application Priority Data

Sep. 21, 1988 [JP] Japan .............. 63-236962

[51] Int. Cl.⁵ .............................. F03B 13/12
[52] U.S. Cl. ................... 415/003.1; 417/330; 60/398
[58] Field of Search .......... 415/3.1, 906; 417/330; 60/398, 495, 502

[56] References Cited

U.S. PATENT DOCUMENTS

| | | | |
|---|---|---|---|
| 875,042 | 12/1907 | Bissell | 60/495 |
| 4,253,032 | 2/1981 | Lochner | 417/330 |
| 4,392,061 | 7/1983 | Dubois et al. | 417/330 |
| 5,005,357 | 4/1991 | Fox | 60/495 |

FOREIGN PATENT DOCUMENTS 9773 3/1977 Japan .
464317 4/1937 United Kingdom ............ 417/330

Primary Examiner—John T. Kwon
Attorney, Agent, or Firm—Jordan and Hamburg

[57] ABSTRACT

A tidal power generation apparatus includes a first group of containers fixed in plural piles in a natural sea having a tidal difference in sea level height, which containers are spaced in parallel to one another at fixed intervals, each container of which is opened at a lower side thereof and is capable of holding air therein, a second group of containers fixed in plural piles in tideless water within an artificial dam, which second group of containers are spaced parallel to one another at fixed intervals, each container of which is opened at a lower side thereof and is capable of holding air therein, and air pipes providing communication between respective containers of the first group in the natural sea and respective containers of the second group within the artificial dam. With the apparatus, the energy in a tide is collected in the form of energy in compressed air created by water pressure at high tide. The compressed air is stored within the artificial dam and, at low tide, is transferred to a container situated at a relatively deeper position in the natural sea to obtain compressed air of even larger energy at the next high tide. Repetition of the above steps enables gathering of tidal energy otherwise dispersed over a wide area.

3 Claims, 3 Drawing Sheets

MULTIPLE-GAS-PHASE TIDAL POWER GENERATION APPARATUS AND METHOD

BACKGROUND OF THE INVENTION

Tidal energy, or the energy in a tide, is an untapped but potential resource. The gross quantity of this energy is sizeable, but it is poor in quality. This is why such energy has not been used commercially. Hitherto, public interest in making practical use of tidal energy has been directed to exploiting the energy contained in a head of sea water. The present invention, however, makes it possible to obtain the energy in the air compressed by means of water pressure and to thus gather tidal energy which is dispersed over a wide area.

It is self-evident that compressed air has energy. The compressed air, if an air pipe is provided in communication therewith, can easily be transported with a small loss in energy.

SUMMARY OF THE INVENTION

The present invention comprises a first group of containers fixed in plural piles in the natural sea having a tidal difference in sea level height, which containers are spaced parallel to one another at fixed intervals, each of which containers is opened at a lower side thereof and is capable of holding air therein; a second group of containers fixed in plural piles in tideless water within an artificial dam, which containers of the second group are spaced parallel to one another at fixed intervals, each of which containers is opened at a lower side thereof and is capable of holding air therein; and air pipes providing communication between the respective containers of the first group in the natural sea and the respective containers of the second group within the artificial dam.

BRIEF DESCRIPTION OF THE DRAWINGS

The present invention will now be described in conjunction with the accompanying drawings, in which.

DESCRIPTION OF THE PREFERRED EMBODIMENTS

Figure 1A:
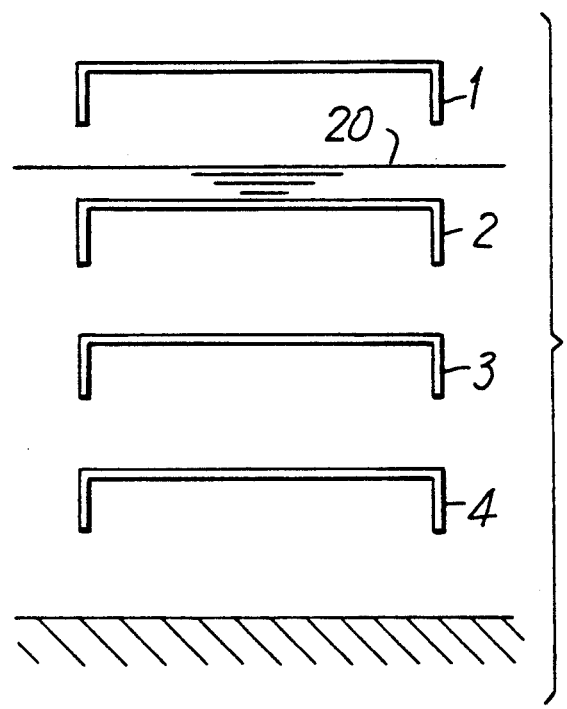
FIG. 1(A) is a schematic cross-section of a first group of containers in the sea at low tide.
Figure 1B:
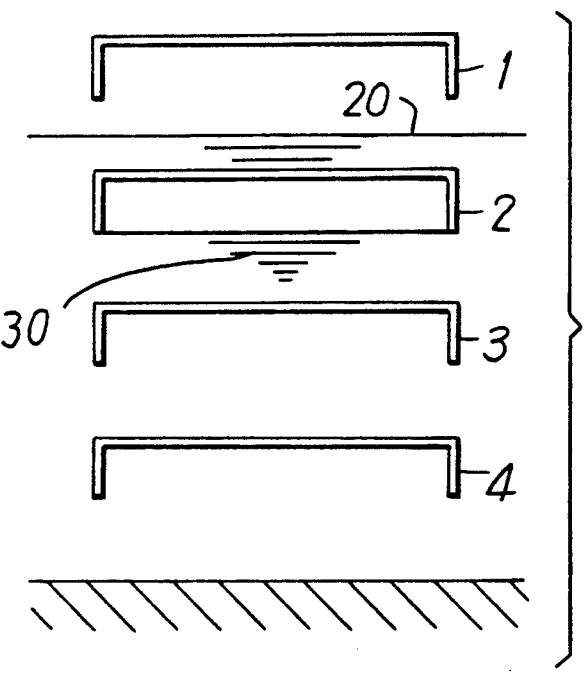
FIG. 1(B) is the same view as FIG. 1(A), except that air has artificially been introduced into the containers.
Figure 1C:
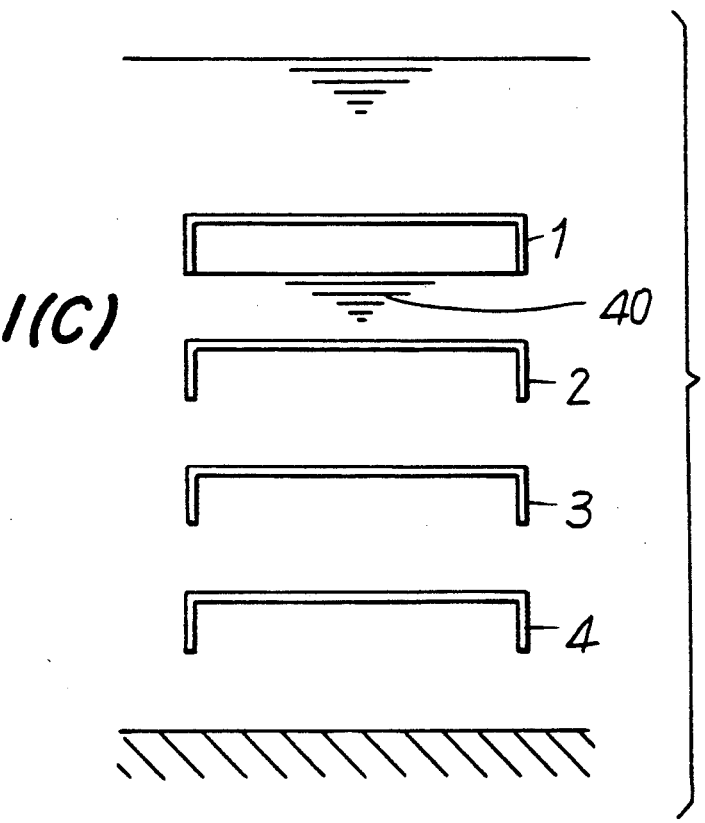
FIGS. 1(C) and 1(D) are the same views as FIG. 1(A), except that the sea is at high tide.
Figure 1D:
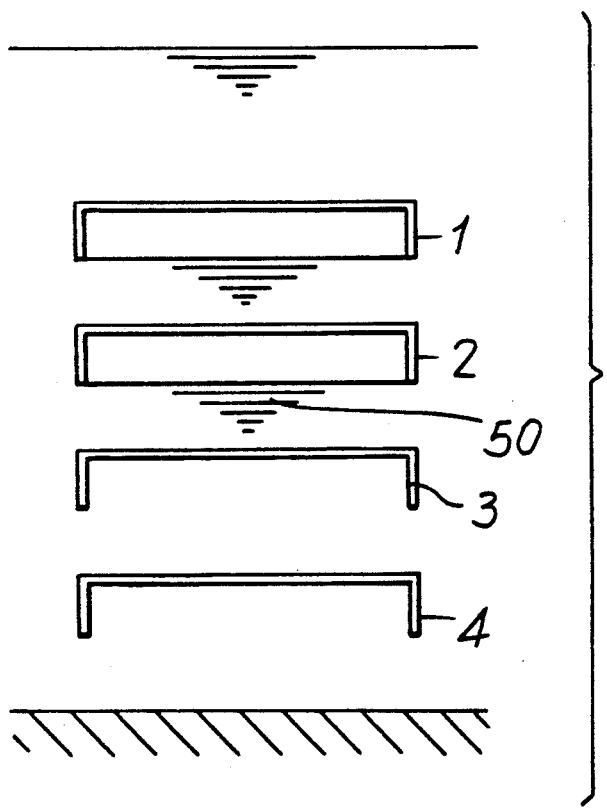
Figure 2:
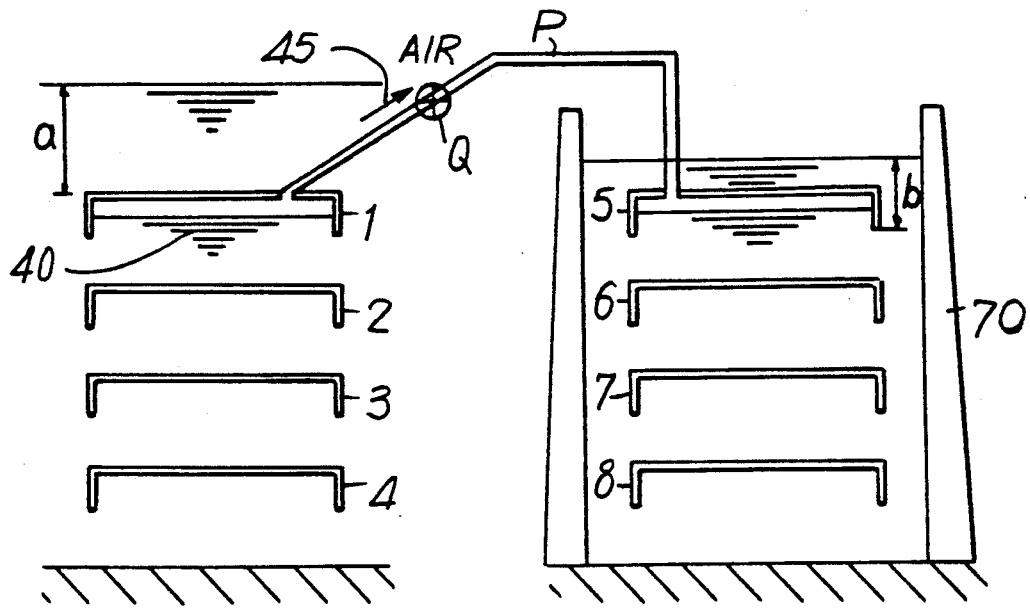
FIG. 2 is a schematic cross-section of one embodiment of the present invention, at high tide.
Figure 3:
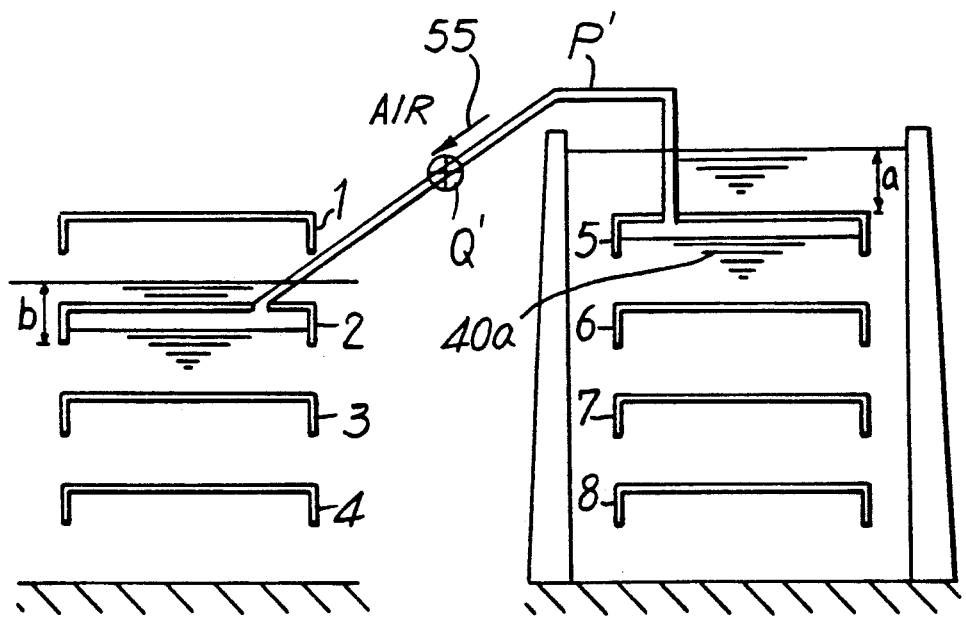
FIG. 3 is the same view as FIG. 2, except that the sea is at low tide.

FIG. 1(A) shows a group of containers 1, 2, 3 and 4 in the sea at low tide, in which container 1 is above the surface 20 of the sea in a state of letting air naturally come therein. FIG. 1(B) shows container 2 in a state in which air 30 has been artificially transferred thereinto to stay as compressed air. FIGS. 1(C) and 1(D) show the containers 1, 2, 3 and 4 at high tide. In FIG. 1(C), compressed air 40 having first tidal energy is made in the container 1. In FIG. 1(D), second tidal energy is added to the compressed air in the container 2. FIG. 2 is a cross-sectional view at a time when the compressed air 40 in the container 1, which has been made as shown in FIG. 1(C) at high tide, is transferred into a container 5 of a group of containers 5, 6, 7 and 8 within an artificial dam 70. The transfer is conducted through an air pipe P in the direction of solid arrow 45 by opening or closing a valve O. FIG. 3 is a cross-sectional view at a time when compressed air 40a, which has been stored in the container 5 of the artificial dam 70 as shown in FIG. 2 at high tide, is transferred into the container 2 in the natural sea at low tide. The transfer is conducted through another air pipe P' in the direction of solid arrow 55 by opening or closing another valve O'.

Referring first to FIG. 1(A), the container 1 lies above the surface 20 of the sea at low tide, and contains air. At this time, the containers 2, 3 and 4 are under water and have no air therein. When the tide has risen to result in the state shown in FIG. 1(C), the compressed air 40 in the container 1 is transferred into the container 5 within the dam 70 through the air pipe P to be stored therein, as shown in FIG. 2. Then, after the tide has ebbed or lowered again, as shown in FIG. 3, the compressed air 40a stored in the container 5 is transferred through the other air pipe P' into the container 2 which is under the surface of the sea. The container 2, after the transfer, comes to the state shown in FIG. 1(B). When the tide has risen again, the container 2 is in the state shown in FIG. 1(D), and more highly compressed air 50 is obtained. By repeating these steps in order, compressed air is made in succession, so that more highly compressed, energetic air for power generation is contained in and can be obtained from the lowermost container 4 at the two high tides every day. Although not shown in the drawings, compressed air of a high pressure is transported to a gas turbine through air pipes to be used for power generation.

At high tide, compressed air may surely be stored within the artificial dam 70 when the storage in the containers within the artificial dam is conducted in the order that, at the beginning, compressed air of the highest pressure is transferred to the lowermost container and, then, those of lower pressures are stored in the corresponding containers located above the lowermost container. In contrast with this, at low tide, when each compressed air within the artificial dam is transferred to a corresponding container in the natural sea, the transfer is started with the compressed air in the uppermost container and, then, those in the subsequent containers located below the uppermost container are transferred. Thus, the invention is theoretically based on the realization of storage of compressed air within a single dam in a three-dimensional manner.

The above implies that sufficient tidal energy can be obtained, even in a sea having a small tidal difference in height of sea level, if there is a certain three-dimensional room under the water. The Ariake Sea in Japan has only a maximum tidal difference of 4 meters in height of the sea level, but has a sufficient area. In such a sea, when using the apparatus of the invention, there is no need of providing several apparatus all over the region of the sea. By digging-out parts of the bottom of the sea, even when each apparatus provided is small in size, sea water above the other parts of the bottom of the sea flows sufficiently into the dug-out part. This means that the tidal energy inherent in the region of the sea can be gathered to be converted into the form of compressed air.

Although the tidal energy thus obtained decreases considerably every time the compressed air is transferred between the containers, additional tidal energy is gained at every high to sufficiently make up for the decrease. The reasons for the decrease are that part of the tidal energy is spent in transferring the compressed air, part of the compressed air has to stay in the air pipes for transfer, which creates dead spaces between the containers, and the air dissolves in the water little by little. With respect to the latter two reasons, the dead spaces can be completely disregarded when the apparatus is continuously operated. Dissolution of the air may be dealt with by taking such measures as making small the area of the sea water to be in contact with the air, or minimizing the movement of the sea water to minimize the dissolution of components of the air, such as nitrogen and oxygen. The transfer of the air between the containers is done, as shown in FIGS. 2 and 3, through the air pipes which are provided on the respective bottoms of the inverted containers, or on the upper part partitions thereof, by opening or closing the valves. In theory, it is possible to transfer the air through the air pipes as far as a water depth a is larger than a water depth b, as shown in FIGS. 2 and 3.

With regard to the fixation of the containers for holding the air in the sea, although the fixation may be made in various ways, providing supporting posts at the bottom of the sea and fixing the containers to the posts is easy and preferred. Each container having air therein is very buoyant, and gives rise to problems such as what material to use for the container and how to fix the same. However, these problems cause no technical difficulty if appropriate measures are taken against the buoyant force in addition to utilizing known technology for constructing a gathering-place for fish.

The tidal energy is one of our untapped but potential resources. The gross quantity of this energy is sizeable, but it is poor in quality. This is the reason why such energy has not been used commercially. The present invention makes it possible to accumulate the energy in air compressed by water pressure in a vertical direction to gather tidal energy which is dispersed over a wide area.

I claim:

1. A multiple-gas phase tidal power generation apparatus comprising a first plurality of containers fixed in plural piles in natural sea water having a tidal difference in height of sea level, said first plurality of containers being arranged one above the other in spaced parallel relation at fixed intervals, each container of said first plurality of containers having an open lower side such that each of said first plurality of containers is operable to hold air therein, tideless water container means containing tideless water, a second plurality of containers fixed in plural piles in said tideless water container means, said second plurality of containers being arranged one above the other in spaced parallel relation at fixed intervals, each container of said second plurality of containers having an open lower side such that each of said second plurality of containers is operable to hold air therein, and a plurality of hollow air pipe means connected and providing communication between each of the respective containers of said first plurality of containers in the natural sea and each of the respective containers of said second plurality of containers within said tideless water container means, said first plurality of containers comprising an uppermost container and an underlying second uppermost container, said uppermost container and said underlying second uppermost container being disposed below the sea water level during high tide, said uppermost container being disposed above the sea water level during low tide, said underlying second uppermost container being disposed below the sea level during low tide, said second plurality of containers comprising a top container, said plurality of hollow air pipe means comprising a first air pipe between said of hollow air pipe means comprising a first air pipe between said uppermost container and said top container, first valve means in said first air pipe to control the flow of air from said uppermost container to said top container via said first air pipe during a rising tide, said plurality of air pipe means comprising a second air pipe extending between said top container and said second uppermost container, and second valve means in said second air pipe to control the flow of air from said top container to said second uppermost container via said second air pipe during low tide.

2. An apparatus as in claim 1, wherein all of said second plurality of containers remain submerged in said tideless water in said tideless water container means during operation of the apparatus.

3. An apparatus as in claim 2, wherein the level of the tideless water in said tideless water container means decreases as the air flows from said top container via said second air pipe to said second uppermost container.

* * * * *